United States Patent [19]

Sims

[11] Patent Number: 5,209,845
[45] Date of Patent: May 11, 1993

[54] SEAL FOR INJECTION MOLDED FILTER BODY

[76] Inventor: Charles Sims, P.O. Box 2787, Gulfport, Miss. 39503

[21] Appl. No.: 713,668

[22] Filed: Jun. 11, 1991

[51] Int. Cl.$^5$ .............................................. B01D 27/08
[52] U.S. Cl. .................................... 210/232; 210/238; 210/450; 55/502
[58] Field of Search .................... 210/232, 238, 450; 55/502

[56] References Cited

U.S. PATENT DOCUMENTS

| | | | |
|---|---|---|---|
| 4,172,798 | 10/1979 | Kronsbein | 210/450 |
| 4,767,530 | 8/1988 | Gilliam et al. | 210/232 |
| 4,855,047 | 8/1989 | Firth | 210/232 |
| 5,013,434 | 5/1991 | Furrow | 210/232 |

Primary Examiner—Robert A. Dawson
Assistant Examiner—W. L. Millard
Attorney, Agent, or Firm—Alexander Norcross

[57] ABSTRACT

A revised sealing structure for an injection molded filter canister, which is resistant to leaks despite the periodic warping of the lid. A nearly square cross-section groove is placed in the body of the filter around the perimeter of the body open end. Within the groove is placed a "lathe cut" gasket; this is an elastomeric gasket having a precision rectangular cross section. On the lid, centered so as to be positioned opposite the groove in the body, and sized to be nearly centered in the groove, is at least one raised, circular ridge. With the addition of the ridge to the lid, in combination with the lathe cut gasket and the revised groove, that the lid may be easily placed in sealing contact with the body, and that the incidence of leaks is substantially eliminated in reinforced plastic molded filters. No special care or skill is needed of the workman in placing and fastening the lid to the filter body to achieve a tight seal.

9 Claims, 3 Drawing Sheets

SEAL FOR INJECTION MOLDED FILTER BODY

BACKGROUND OF THE INVENTION

This invention relates to the field of liquid filters, of the type commonly known as toilet paper filters.

It has long been known that very fine filtration can be obtained, removing particulate contaminants from liquids, by flowing the liquids along an extended filter path across the surface formed between two adjoining sheets of filtration material. This filter action is in distinction to the more common filter action in which a liquid is forced through a membrane or porous material; in the latter case, proper filtration requires very careful design of the membrane, and the size of the particles successfully filtered is a function of membrane porosity and the uniformity of the membrane.

The usual form of the first above described filters is the axial flow, wound fibrous tissue filters, popularly known as paper towel filters. These filters use the filtration capability inherent in passing a fluid axially along the surface between two tightly adjoining sheets of fibrous tissue. The fluid does not pass through any given sheet and thus the normal manufacturing tolerances inherent in membrane or porous filters are not required. Significant work has been done on the design of such filters, because of the low cost and widespread availability of filter media in the form of commercially available paper towels, or toilet paper rolls.

Such filters are used in by-pass oil filtration, and are capable of significant filtration. However, in such use, the filter body is exposed to hot lubricating oil, and, being paralleled with the lubrication system, is under full system lubrication pressure. These filters are intended to run in unattended service, and usually are outside the metered lubrication system. By-pass filtration works by continuously diverting a portion of the lubrication oil flow through the filter during normal engine operation.

The usual form of this filter is a body section, containing a filter cartridge, which is plumbed to the lubrication oil supply. the body is closed off by a lid, which is removable to permit removal and replacement of the filter element.

The joint between the lid and the body is subject to leakage, which if not prevented, will result in gradual loss of all lubricating oil and subsequent engine failure. This leakage problem is an important reason that the use of such filters is not more widespread. As a result, significant effort has been expended in sealing the lids of such filter media against leakage.

Such filters are shown in, for instance, S. K. Yee, et al, U.S. Pat. No. 3,308,957, the Frantz filter, which is considered typical of the paper towel or toilet paper filter, and U.S. Pat. No. 3,504,803 to Brayman and U.S. Pat. No. 4,017,400 to Schade.

Each such patent discloses an axially wound roll of filter material described generally as being a paper towel or toilet paper roll, the rolls subsisting upon a supporting cardboard tube (for instance, the Yee patent, Item 35). This tube is supported axially within the filter canister.

A lid is clamped onto the top of the filter canister, and an O-ring seal is usually placed between the lid and the body of the filter canister to reduce leaks. In order to insure a tight, leak free seal, the canister is made of a dimensionally stable, accurate material. This has usually required that the body and lid be made of machined metal construction, with attendant high manufacturing costs. Molded plastic containers have been tried, but suitably dimensionally stable materials tend to be restricted to low temperature, low pressure service. Lubricating oil filters must be capable of withstanding high temperatures and high pressures.

The clamps for holding together such lids are of a screw adjusted type, which are tightened about the filter canister by finger tightening of a knob, threaded to advance on the screw. This arrangement gives sufficient mechanical advantage to clamp a high dimensional tolerance lid and canister, such as a metal body.

However, when injection molded plastics are substituted for metal bodies, satisfactory, reliable seals have only been achieved in those plastics, such a polycarbonates, which are capable of being molded to the dimensional accuracies of machined metal. The nature of the injection molding process requires that thermosetting plastics be used; by definition, such plastics change shape with temperature, and, for the temperatures typically encountered in lubricating oil service, such dimensionally accurate plastics as polycarbonates cannot be used. Reinforced or composite high temperature injection molded materials, such as glass filled nylons, are much more sensitive to molding conditions, and often display significant dimensional instabilities in such high temperature, high pressure service.

SUMMARY OF THE INVENTION

This invention relates to the field of filters of the externally mounted type which filter oil under pressure across a filter medium.

Such filters are common in engine powered equipment for filtering lubricating oil, but also find use filtering other liquids such as fuel or for filtering air for pneumatically actuated systems, and other equipment. The pressures encountered in some systems range beyond 250 PSI.

All such filters have a body section or canister, which contains the filter element, and a lid or cover for the body to close off the filter element and fluid circulation, yet provide access for changing filter elements. Leakage from the lid under operation is a critical concern. Most such filters run unattended, and often are out of view of the equipment operator. Leakage can cause fluid loss, which in the case of lubricating fluids, results ultimately in total equipment failure.

Where the filter is of the by pass type, which filters lubricating fluids continuously, but is not in the direct lubricating feed line, it is possible for total fluid loss to occur before the loss is detected. Under such usage, even a tendency towards leakage in a filter under normal, unskilled maintenance workmen's care, is unacceptable, and filters believed to have leakage problems will not achieve commercial acceptance.

As a result, small by pass oil filters of the externally mounted type having an internal filter cartridge, are built of machined metal construction, so as to preserve tight tolerances in the sealing surfaces between lid and body. Such construction is expensive in materials, and very costly in terms of labor required for construction of the filter. Another major disadvantage of metal filters is corrosion.

Filter bodies are known to be much more easily built using injection molded engineering plastics. This technology is capable of producing, at low costs, large numbers of repeatable shapes, at relatively high precision.

However, the typical injection molded plastics are not strong enough for high pressure filtration.

Any item that is injection molded must have certain construction features. Of importance for this invention, any cavity in an injection molded article must be slightly concave, and tubular surfaces must slightly taper inward, so that the article can be removed from the mold. The more precise the molding process, the tighter the fit of cooled item to mold to preserve dimensional tolerances, and the more important such tapers become.

The typical filter lid is sealed to the filter body by using a gasket in a groove around the circumference of the body opening which mates to the lid to prevent leaks. A typical O-ring seals by a slight deformation, and the higher pressure the O-ring must withstand, the smaller the deformation that it will accept. If the O-ring has a tendency to be too soft, it will flow under continuous pressure and ultimately fail. Thus, for small, high pressure filters, only very small deformations are possible in the O-ring if a seal is to be maintained; the filter body must therefore be built to high dimensional tolerances to maintain an adequate seal; very little deviation is allowed, as an O-ring has very limited capability to correct for variations in gap distance between lid and body.

Injection molded plastic bodies would be desirable for such filters due to their low cost, their being readily producible, and low or no corrosion. However, the characteristics of such plastics create severe problems for such filters, and have heretofore prevented the use of the stronger inexpensive injection molded plastics.

In order to provide adequate strength against bursting, as required for high pressure oil filtration systems, the filter body should be molded from a reinforced or composite thermosetting plastic. For various reasons, glass filled nylon would be the preferred candidate material. However, such a glass filled nylon body is highly susceptible to leakage around the lid, and duplication of prior filter body designs in such a material has often resulted in unsatisfactory filters.

I have discovered that a principal source of such failure is a permanent, significant temperature related shrinkage of the filter body during initial use. This shrinkage appears to be related to the material used for body molding, and is worst for the otherwise highly desirable composite plastics. The shrinkage results in a filter that, although properly tightened in initial use, fails.

Injection moldable plastics lack the overall strength of metal filter bodies; as a result, plastic lids, which represent a large, unsupported surface area in a can shaped filter, usually require stiffening ribs to maintain adequate stiffness.

If such a lid is injection molded from a composite material, such as a glass filled nylon, for strength, the stiffening ribs are found to cause uneven cooling within the mold, and during setup. Such thermo- setting plastics, cooling unevenly, tend to warp near areas of uneven thickness. The stiffening ribs in the lid are a major change in plastic thickness. For typical filled or composite molded plastics, injection molded lids have a significant repeated waviness around their perimeter, the total amount of such warping is barely perceptible to the trained eye, but it is sufficient to produce leakage failures in typical O-ring seals of the current art between lid and body.

The current invention permits the use of injection molded plastics of composite construction and high strength by providing a revised ring sealing structure which is resistant to leaks despite the periodic warping of the lid. Additionally, it is observed to reduce the incidence of lid warping in injection molded lids with reinforcing ribs.

The invention is, in combination, a nearly square cross-section groove in the body of the filter around the perimeter of the body open end. Because the filter is to be injection molded, the cross-section is not perfectly square, by the side walls must taper slightly together nearer the bottom of the groove.

Within the groove the O-ring of the current art, which is circular in cross section, is replaced by a "lathe cut" gasket; this is an elastomeric gasket having an exact cross section.

On the lid, centered so as to be positioned opposite the groove in the body, and sized in diameter to be near the groove, is at least one raised, circular ridge.

It has been discovered that, with the addition of the ridge to the lid, in combination with the lathe cut gasket and the revised groove, that the lid may be easily placed in sealing contact with the body, and that the incidence of leaks is substantially eliminated in reinforced plastic molded filters. No special care of skill is needed of the workman in placing and fastening the lid to the filter body to achieve a tight seal.

It is thus an object of the invention to disclose a construction for a small pressurized filter which eliminates the leakage incident to construction of the filter from injection molded composite plastics.

It is a further object of the invention to show a construction of a small pressurized filter which may be made from injection molded glass filled nylon.

It is a further object of the invention to disclose a construction for a circular filter lid with reinforcing rib which has significantly reduced edge warping when injection molded from composite or reinforced plastics.

It is a further object of the invention to disclose a construction for a circular filter lid with reinforcing rib which has significantly reduced edge warping when injection molded from plastics having poor or uneven thermal conduction during setup.

DETAILED DESCRIPTION OF THE PREFERRED EMBODIMENT

Figure 1:
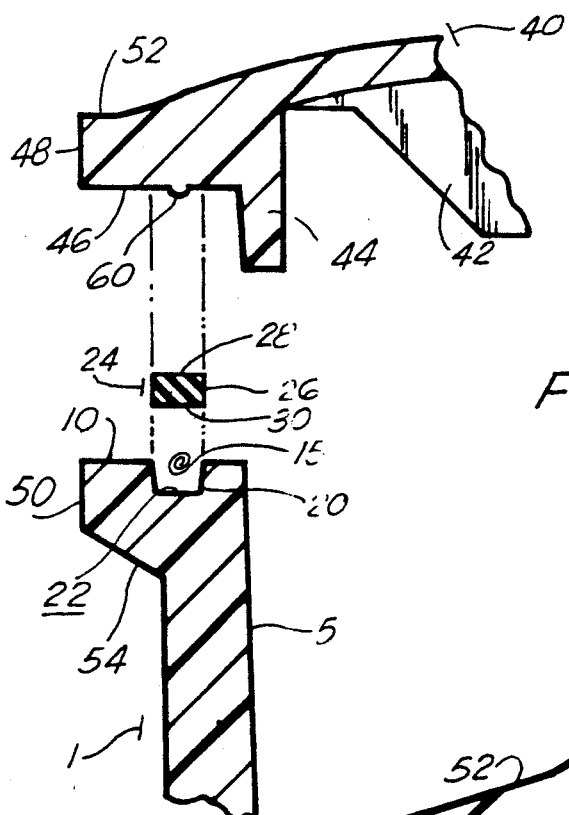
FIG. 1 is a sectional view of the lid, seal and sidewall of the invention.
Figure 2:
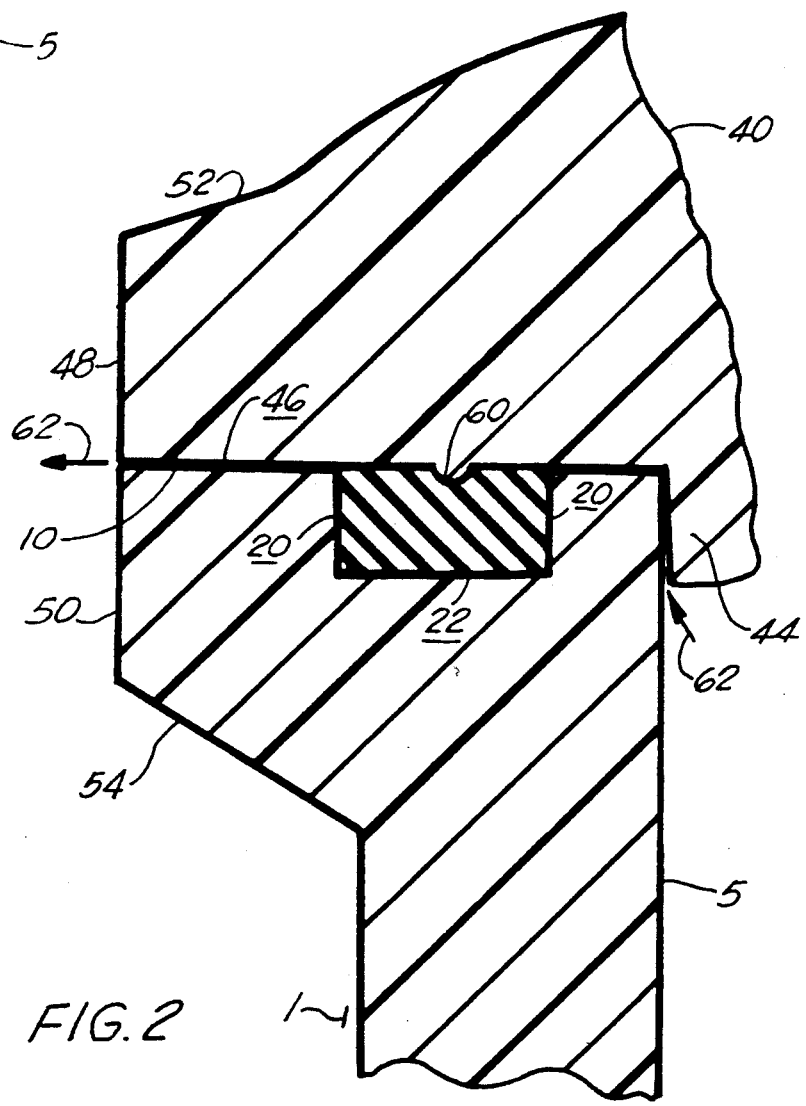
FIG. 2 is a view of the lid seal of the invention in closed position.

All toilet paper filters are in the form of a closed cylindrical canister 1 which contains the filter element, and is closed against leakage by a lid 40. The interior of the canister 1 is under the full pressure of the fluid being filtered. For engine lubricating oils, this can result in working temperatures as high as 250 degrees F., and working pressures as high as 100 to 150 psi. Typically a groove 15 is cut between the top edge 10 of the filter canister side wall 5, and fitted with an O-ring; this ring then is expected to seal against the lid 40.

As is known, such O-rings deform easily under pressure, and such a seal can only be maintained if the lid 40 and top edge 10 are maintained tightly against each other, which means that the dimensions of each must be accurate, invariant and repeatable from one unit to another. Typically this has required a machined metal body, which is expensive. Molded plastic filter bodies would be preferred from a manufacturing viewpoint, but, as a general rule, the stronger and more heat resistant the molding plastic, the more difficult it is to maintain the requisite dimensional stability.

In fact, a phenomenon has been discovered by the inventor, where a molded high strength plastic filter body will continue to anneal in initial use. This results in the body changing dimensions sufficiently that a leak will develop between the body and lid, even though no leak existed when the filter was initially set up.

The invention is of an improved seal between body and lid which permits the maintenance of adequate high pressure sealing in molded plastic filter bodies even in the presence of dimensional instability and warping of the filter body in use.

Referring to FIGS. 1 and 22, I show the detailed view of the inventive seal of my filter. I use injection molding and thus form the filter canister as a body molding 1. This filter canister or body molding has a side wall 5 is flat ended to form a top edge 10. In all preferred embodiments of this filter, the canister is cylindrical, and thus the top edge 10 is circular. For clarity, I describe the below structure in cross section, as the leakage path 62 for the filter is best seen that way, but it must be borne in mind that the sealing face and mating top edge, as well as the other components of my improved seal, are circular in top view, and are best structurally described as circular or as rings.

Within top edge 10 is formed seal receiving groove 15. This groove has an essentially flat bottom 22. The sides 20 of the groove 15 must be tapered slightly, being narrower at the bottom; this is a requirement of the injection molding process, to permit the mold to be separated from the body molding 1.

Within the seal groove 15 is placed a lathe out gasket 24. This is an elastomeric gasket, cut in the form of a torus or ring, save that it is formed with square, flat sides 26, and has a flat top 28 and bottom 30 surface; in cross section gasket 24 is thus rectangular in shape. This gasket 24 is cut such that it substantially fills the seal receiving groove 15, but extends slightly above the top edge 10. In practice gasket top surface 28 extends between 18 and 23 thousandths inch(0.018 to 0.023) above top edge 10.

Mating with filter canister body molding 1 is a lid 40. In one embodiment of the invention, lid 40 and filter canister body molding 1 are formed of injection molded, glass filled nylon. The use of a plastic material instead of metal requires that reinforcing ribs 42 be placed in the lid 40 to strengthen the lid 40 against blowout or damage. These reinforcing ribs 42 can be a source of warpage and dimensional instability in the lid 40, as they apparently concentrate thermal stresses due to the nonuniform concentration of mass of the plastic in the lid 40.

Lid 40 extends downward around its perimeter, forming inner lip 44 which fits down into canister body molding 1. The lid 40 then extends outward, forming a circular, flat seal face 46, in opposed juxtaposition to canister body molding top edge 10. Lid 40 then ends in outer circumferential edge 48, which is normally sized to have the same diameter as the outer circumferential edge 50 to the side wall 5 of the filter canister body molding 1.

The upper, outer surface of the lid 40 forms an external upper edge face 52. A corresponding external lower edge face 54 is formed on filter canister body molding 1. Upper face 52 and lower face 54 are preferably slightly tapered together in the direction of the outer circumferential edge 50, but the clamping described below will also work if one or both are not tapered, but are flat.

Extending downward from seal face 46, and located in a position essentially centrally positioned over seal groove 15, is a sealing ridge 60. The lid 40 is in shape a circular surface; sealing ridge 60 is a circular ridge extending outward of seal face 46 for a significant distance; and takes the form of a ring affixed to seal face 46, extending outward of seal face 46. Seal ridge 60 should be a substantial, relatively thick ridge; in the preferred embodiment the seal ridge 60 extends for approximately 10 to 12 thousandths inch beyond seal face 46; the ridge 60 is also approximately 10 to 12 thousandths inch wide at its base, and is generally rounded in cross section.

This ridge 60 is sized so that, even after the dimensional changes occasioned by aging or shrinking of the filter, positive, continuous indentation contact is maintained with the gasket 24. This also minimizes contact of the gasket with the filtered liquid, such as oil, which would result if the gasket were extended higher in anticipation of the space between the lid and the filter canister. This allows the use of gasket materials which may be adversely affected by some filtered hydrocarbons, such as paint thinner.

Figure 3:
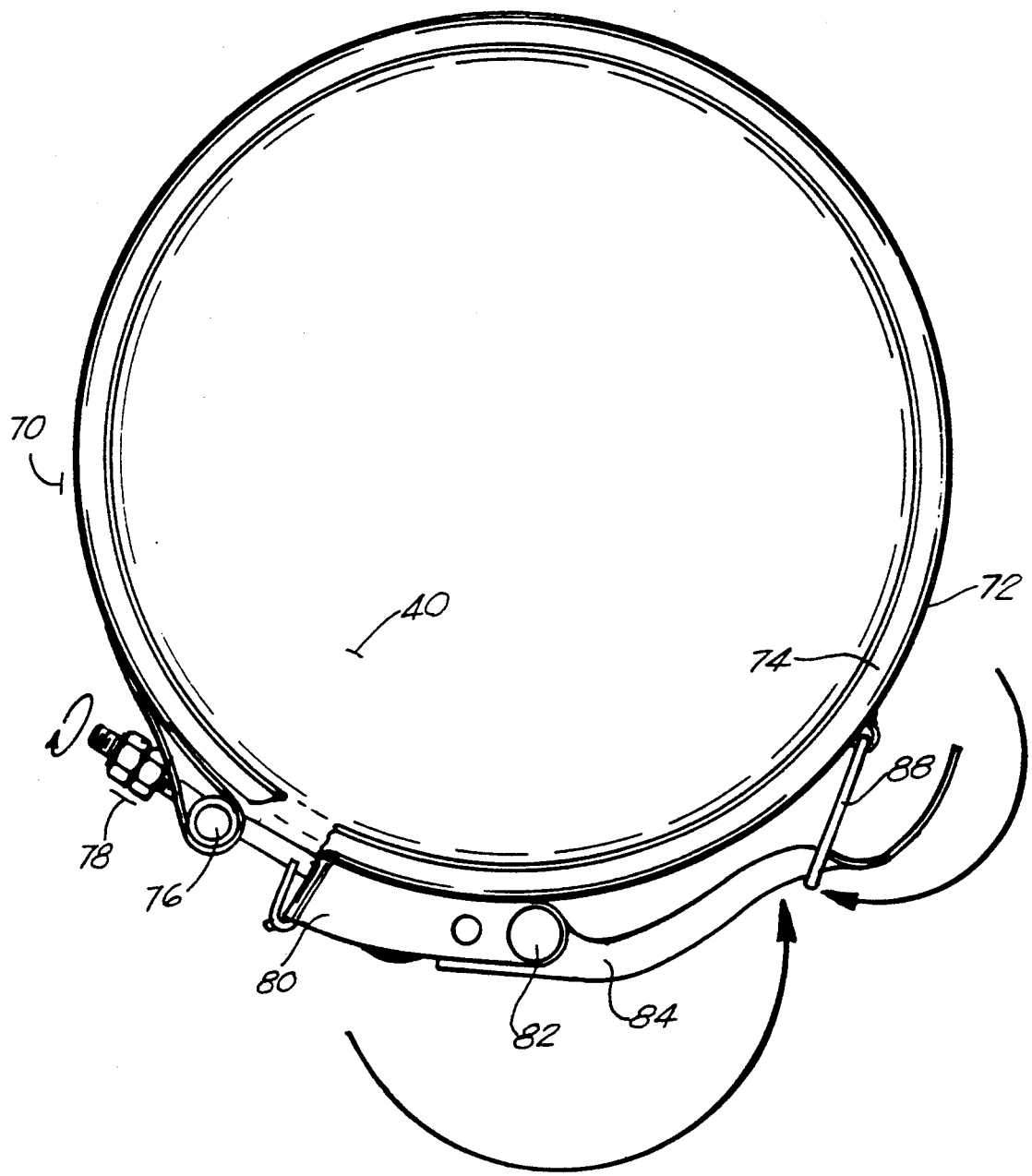
FIG. 3 is a top view of the clamp of the filter in closed position.
Figure 4:
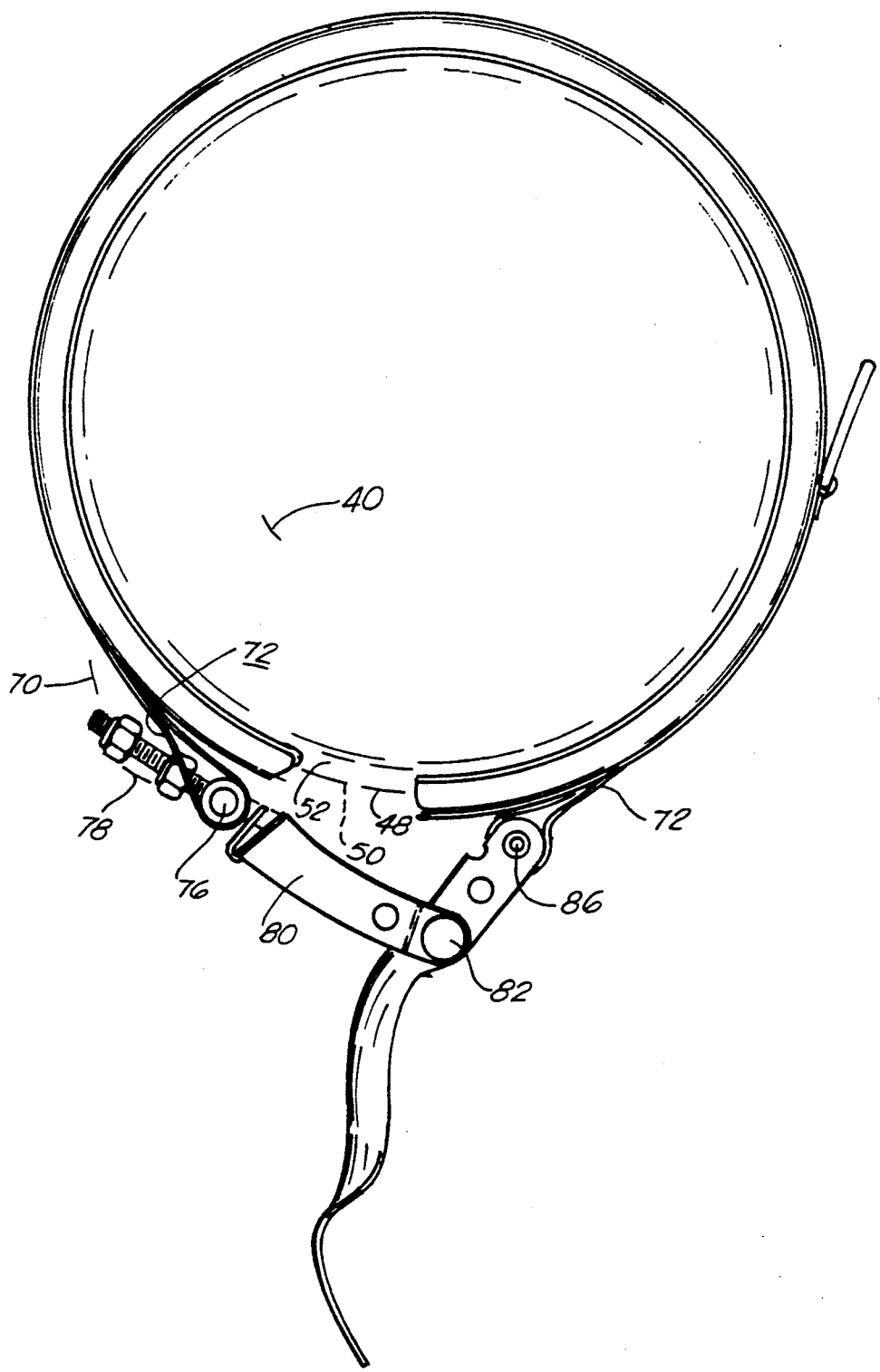
FIG. 4 is a top view of the clamp of the filter in unlatched position.

Lid 60 is secured to filter canister body molding 1 by means of a clamp which encircles the outer edges of the lid and filter canister. A preferred form of clamp is shown in FIGS. 3 and 4. In this embodiment, clamp 70 is a circular clamp, which surrounds and encloses both lid outer circumferential edge 48 and body outer circumferential edge 50. Clamp 70 is a circular binding strap 72 which is fixed to, for instance by welding, a circular clamping inner face, a strong "C" shaped band of metal sized to engage together upper edge face 52 and lower edge face 54 as binding strap 72 is tightened around both lid outer circumferential edge 48 and body outer circumferential edge 50.

The preferred means for tightening the clamp 70 is by an overcenter lever arm, which may be adjusted to adjust the total circumferential length of the clamp 70. In the preferred embodiment, this overcenter lever comprises a pivoting strap toggle arm 76, which is enclosed in a wrapped around and welded end of the binding strap 72. Strap toggle arm 76 is tapped to receive a length adjusting bolt and nut 78, which may be turned to adjust the length of strap link bar 80, which is fixed to adjustment bolt 78. Adjustment bolt 78 is further fitted with two nuts, which will be understood to be an adjusting nut and a lock nut to secure the adjusted length of the bolt 78 and link bar 80. Alternatively, one self-locking nut may be used.

Strap link bar 80 is pivotally fastened to a mid point or pivot point 82 on strap clamp arm 84. Strap clamp arm 84 forms a lever arm, pivotally fastened at a clamp arm pivot 86 to binding strap 72, permitting, by its overcenter throw, the application of significant tightening force, drawing the ends of the binding strap 72 together to a distance determined by the adjusted length of strap link bar 80.

In use the length of the adjusting bolt 78 is changed so that, when strap clamp arm 84 is pivoted from the open position shown in FIG. 4 to the overcenter, clamped position shown in FIG. 3, the clamping inner face 74 clamps together upper edge face 52 and lower edge face 54, forcing together seal face 46 and top edge 10.

Any leakage must be through leakage path 62, between the opposing seal face 46 and top edge 10. In the prior art metal bodies, the dimensional stability of the lid 40 and filter canister body molding 1 permitted an O ring to be sufficient for such a seal, and permitted the successful use of a finger tightening clamp. However, even a slight dimensional change can produce a leak, with ultimate catastrophic consequences, especially in high pressure service.

Thus in one example a filter canister molded of glass filled nylon was sealed and clamped in new service. Within the first 5 to 10 hours of operation the heat annealing produced by cyclic exposure to heated lubricating oil had reduced the inner diameter of the canister by approximately 25 to 30 thousandths (0.025-0.030) inch. This change was sufficient to cause a leak which resulted in loss of a significant fraction of the engine lubricating oil before discovery.

In a second example, a series of cold injection-molded lids were found to have a warpage of 5 to 10 thousandths of an inch when received from the manufacturer. Installation of these lids on filter canisters could not be completed with O-ring seals, as, even under full finger tight clamp tightening, leaks occurred continually.

By contrast, a series of lids bearing the improved sealing ring were made with up to 10 thousandths inch warpage, and mated to filter canisters bearing the lathe cut seal of the invention. These units were tested to simulate engine oil filter service, exposed to approximately 100 to 120 PSI air, considered a more severe leakage test than oil, due to the smaller molecular size. No leakage occurred, either during initial use, or upon inspection after extended use.

In a further test, a filter canister body molding bearing the improved seal was installed on an engine. An initial clamp adjustment was made to a tightness which required the full force of two hands to latch the clamp arm over-center. After two hours of use, the canister had shrunk to the point that the clamp arm could be thrown over-center with two fingers. Despite this shrinkage, and throughout this range of clamp pressures, no leakage occurred.

None of the prior art O-ring seals would have passed the above tests, or shown the reliability necessary for unattended oil filtration service.

I have shown an improved filter seal combination for an injection molded, plastic lid and body high pressure filter canister. A specific embodiment has been described, but the invention may be seen to encompass a wider range of equivalent sizes, and thus is not limited to the one test filter but extends to the wider scope of the claims.

I claim:

1. A pressurized, injection molded Filter of the paper roll type comprising:
   A body molding defining a circular top edge;
   a lid molding for closing said body molding, defining a circular seal face opposingly juxtaposed to said top edge;
   a seal comprising:
   a circular groove, having inwardly tapering sides, within said top edge;
   a lathe cut gasket within said groove, extending a distance above said top edge; and
   a circular ridge extending below said seal face opposing said lathe cut gasket;
   said seal face and said ridge both being in contacting relationship with said gasket to close said seal.

2. The apparatus of claim 1 further comprising:
   said lid defining an external upper edge face;
   said body molding defining a lower external edge face;
   means for clamping said upper edge face and said lower external edge face together to close said seal.

3. The apparatus of claim 2, wherein aid means for clamping comprises:
   a clamp having a band, circumferentially enclosing said body molding and said lid;
   means for tightening said band about said body molding and said lid;
   a tapered, clamping inner face affixed to said band, contacting engaging said upper edge face and said upper edge face.

4. The apparatus of claim 3, said clamping inner face comprising a C-shaped metal band.

5. The apparatus of claim 1, wherein said lathe cut gasket comprises:
   a ring shaped gasket having a flat upper face, a flat lower face, and flat sides, defining in cross section a rectangular shape;
   said flat side not meeting said tapered sides of said circular groove when said gasket is inserted in said groove, whereby said gasket is susceptible to shifting position in said groove.

6. The apparatus of claim 3, said means for tightening said band comprising:
   said band having a first end pivotally affixed to a lever arm;
   said band having a second end pivotally affixed, through means for adjusting length, to a mid-point on said lever arm;
   said lever arm swinging through an overcenter position drawing said band ends together to a closed position determined by said means for adjusting length.

7. In an injection molded filter canister body, characterized in that all groves must be sightly tapered and flat surfaces may warp, having a circular top edge defined on a body molding and a circular seal face defined on a closing lid opposingly juxtaposed to said top edge, the seal improvement comprising:
   a circular groove within said top edge;
   a lathe cut gasket within said groove, extending a distance above said top edge; and
   a circular ridge, of a width less than the width of said gasket, extending below said seal face opposing said lathe cut gasket.

8. The apparatus of claim 7 further comprising means for clamping said top edge against said seal face, said means comprising:
   a clamp having a band, circumferentially enclosing circular lid and said circular lid;
   means for tightening said band about said body molding and said circular lid;
   a tapered, clamping inner face affixed to said band, contacting compressing said circular lid against circular lid;

said seal face and said ridge being compressed into contacting relationship with said gasket upon tightening said band.

9. The apparatus of claim 7 further comprising:

said band having a first end pivotally affixed to a lever arm;

said band having a second end pivotally affixed, through means for adjusting length, to a mid-point on said lever arm;

said lever arm swinging through an overcenter position drawing said band ends together to a closed position determined by said means for adjusting length.

* * * * *